(12) United States Patent
Greatwood (10) Patent No.: US 8,171,061 B2
(45) Date of Patent: May 1, 2012

(54) FILE-SYSTEM BASED DATA STORE FOR A WORKGROUP SERVER

(75) Inventor: Duncan MacDougall Greatwood, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 605 days.

(21) Appl. No.: 11/638,860

(22) Filed: Dec. 14, 2006

(65) Prior Publication Data

US 2010/0023596 A1 Jan. 28, 2010

(51) Int. Cl.
*G06F 17/30* (2006.01)

(52) U.S. Cl. .................................. 707/821; 707/822

(58) Field of Classification Search ................ None
See application file for complete search history.

(56) References Cited

U.S. PATENT DOCUMENTS

| | | | |
|---|---|---|---|
| 5,913,032 A | 6/1999 | Schwartz et al. | |
| 6,397,230 B1 | 5/2002 | Carmel et al. | |
| 2003/0120737 A1 | 6/2003 | Lytle et al. | |
| 2004/0177319 A1 | 9/2004 | Horn | |
| 2005/0234979 A1* | 10/2005 | Martineau et al. | 707/103 X |
| 2006/0036568 A1* | 2/2006 | Moore et al. | 707/1 |
| 2007/0150496 A1* | 6/2007 | Feinsmith | 707/100 |

OTHER PUBLICATIONS

"Notification of Transmittal of the International Search Report and the Written Opinion of the International Searching Authority, or the Declaration," International Filing Date: Dec. 12, 2007, International Application No. PCT/US2007/25384, Applicant: Postpath, Inc., Date of Mailing: May 22, 2008, pp. 1-4.

* cited by examiner

*Primary Examiner* — Baoquoc To (57) ABSTRACT

A system and method for storing workgroup objects on a file-system based data store in a workgroup server is disclosed. The present invention implements a file-system based workgroup system in which a workgroup object is stored in one or more files. The present invention further includes a workgroup object list comprising object identifiers, each object identifier uniquely mapping to a workgroup object and each object identifier including a property of the workgroup object based on which the workgroup object list is sorted.

35 Claims, 11 Drawing Sheets

FILE-SYSTEM BASED DATA STORE FOR A WORKGROUP SERVER

BACKGROUND

The present invention relates generally to storage of electronic data. More specifically, the present invention relates to a system and method for storing workgroup objects on a file-system based data store in a workgroup server.

In recent years workgroup systems have rapidly emerged as indispensable tools for providing integrated information exchange facilities to individuals in business enterprises. Workgroup systems provide such facilities as e-mail messaging, individual and group calendaring, files and folder sharing, scheduling tasks and so forth.

Workgroup systems are generally implemented in client-server architecture. A workgroup server stores multiple workgroup objects in a storage device. The workgroup object may be defined as an entity representing one of an e-mail message, an individual calendar, a group calendar, a shared file, a shared folder, a user-scheduled task, an address book, an electronic form, and the like. A workgroup client runs a workgroup client software application and accesses the workgroup server to retrieve one or more workgroup objects. The workgroup servers known in the prior art use a variety of underlying storage mechanisms such as relational databases, proprietary object databases, data type specific storage structures, file-system based storage and so forth. The end-users are always dependent on the provider of such proprietary databases for any utilities that are associated with workgroup server.

The file-system based storage scheme offer several advantages over other storage mechanisms. It facilitates the administration of the workgroup server by providing such features as live back-up of data, clustering, journaling, caching, and so forth.

However, the file-system based storage scheme does not provide a built-in facility for sorting and searching the workgroup objects. In addition, the file-system based storage scheme necessitates creation of a large number of files. Moreover, there is a dependence on the file-system implementation for managing the large number of files.

More importantly, in a workgroup server subjected to concurrent access by multiple users, efficient memory management is a key requirement. Another challenge involved in implementing the file-system based storage scheme is to ensure the integrity of the workgroup objects. Moreover, there is a need to provide the end-users flexibility with respect to the tools and utilities that are available to be used in conjunction with a workgroup server.

In light of the foregoing discussion, there is a need to address the challenges involved in implementing a file-system based data store for a workgroup server.

SUMMARY

An object of the present invention is to implement a file-system based workgroup system.

Another object of the present invention is to optimize the memory management in the file-system based workgroup system.

Yet another object of the present invention is to minimize the disk-access activities in the file-system based workgroup system.

The present invention implements a file-system based workgroup system in which a workgroup object is stored in a primary file and one or more secondary files. A first set of properties of the workgroup object are stored in the primary file and each of a second set of properties of the workgroup object are stored in a corresponding secondary file. The present invention further includes a workgroup object list comprising object identifiers, each object identifier uniquely mapping to a corresponding workgroup object and each object identifier including a property of the object based on which the workgroup object list is sorted.

The file-system based storage on a workgroup server, as described herein, thus offers several advantages. The present invention helps in reducing the disk-access activities for various operations associated with the workgroup server, for example, listing of folders, listing of contents of a folder, displaying an object, and so forth; thereby improving the performance of the workgroup server. The present invention provides the facility to optimize the disk-access activities and thus improves the performance based on the information of the specific details of the problem domain and common usage patterns.

Further, the present invention provides the end-users the facility to exploit a variety of tools and utilities for performing various activities associated with the workgroup server. The end-users have the option of selecting from a variety of tools available from the third-party vendors.

The present invention reduces memory required to store workgroup object lists in active memory. The workgroup object lists include simple data structures which are sorted based on data stored in the data structure. The binary search used to locate a position in the list helps to reduce the system overheads and thereby improves the efficiency. Further, the present invention facilitates the administration of the workgroup server by providing such features as live back-up of data, clustering, journaling, caching, and so forth.

The present invention, thus offers a simpler, more efficient, and more flexible workgroup system that is easier to implement and maintain.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

DESCRIPTION OF VARIOUS EMBODIMENTS

Various embodiments of the present invention provide a system and method for managing one or more workgroup objects on a workgroup server.

Figure 1:
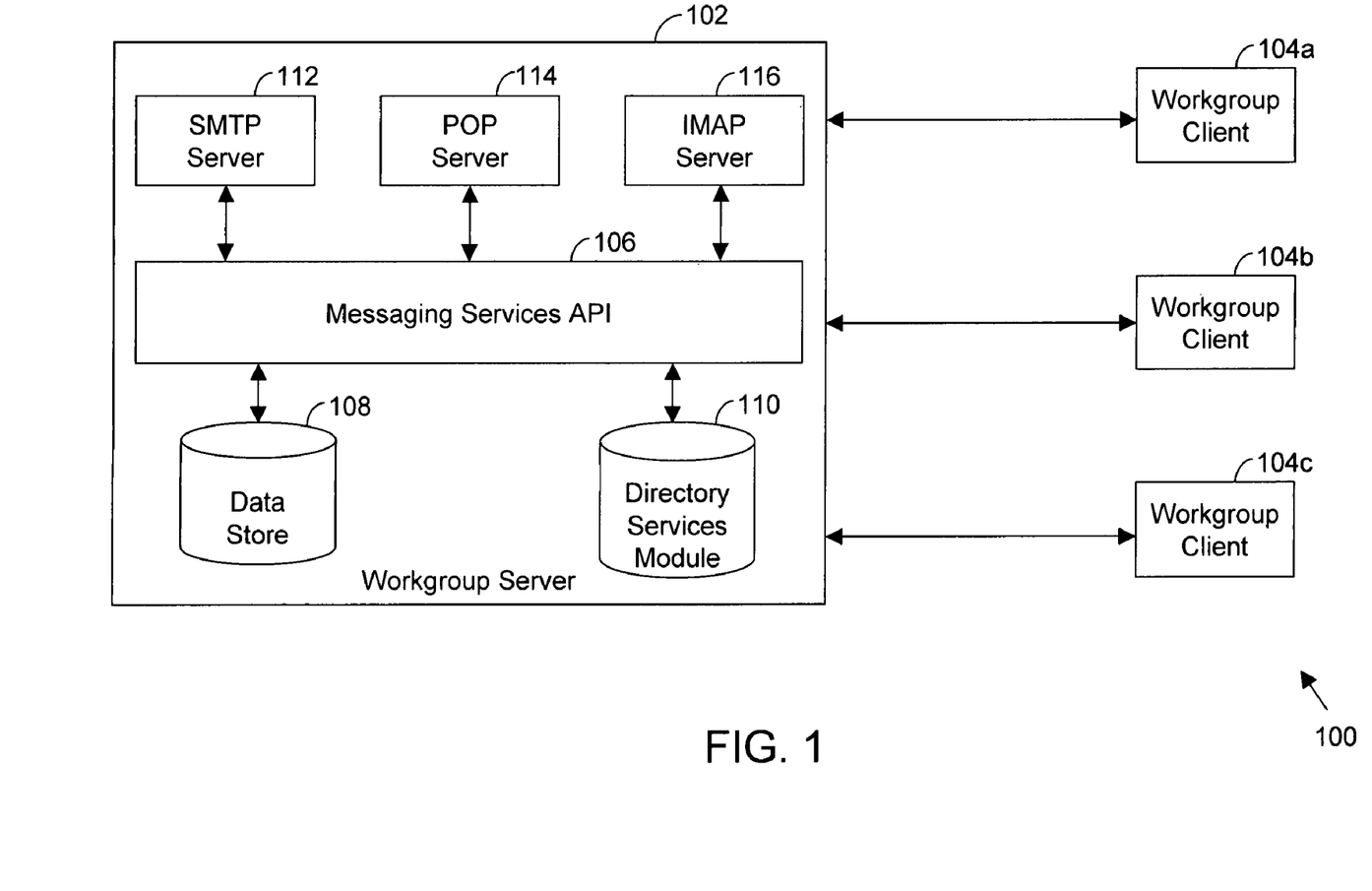
FIG. 1 is a block diagram illustrating a client-server model of a workgroup system in which the various embodiments of the present invention may be implemented.

FIG. 1 is a block diagram illustrating a client-server model of a workgroup system 100 in which various embodiments of the present invention may be implemented. Workgroup system 100 includes a workgroup server 102 and a plurality of workgroup clients 104a, 104b, and 104c, hereinafter referred to as workgroup clients 104. Workgroup server 102 includes a messaging services application programming interface (API) 106, a data store 108 and a directory services module 110. In an embodiment of the present invention, workgroup server 102 may include a Simple Mail Transfer Protocol (SMTP) server 112, a Post-Office Protocol (POP) server 114, and an Internet Message Access Protocol (IMAP) server 116.

Workgroup server 102 stores one or more workgroup objects. Workgroup clients 104 access workgroup server 102 to retrieve one or more workgroup objects.

Workgroup server 102 is a server computer supporting multiple accesses to a workgroup server software application. The workgroup server software application is an application running on workgroup server 102 and performing server-side operations in workgroup system 100. In various embodiments of the present invention, workgroup server 102 may be a server computer, for example, a blade-server computer, a rack-mounted server computer, an entry-level server computer, and so forth.

In workgroup server 102, SMTP server 112, POP server 114, and IMAP server 116 in conjunction with messaging services API 106 manage the transfer of one or more workgroup objects in accordance with a corresponding protocol. Data store 108 stores one or more workgroup objects. Directory services module 110 accesses a directory (not shown in the figure) to retrieve addressing and routing information thereby facilitating routing the one or more workgroup objects. Examples of the directory that stores the addressing and routing information include Lightweight Directory Access Protocol (LDAP) and the like.

Each of workgroup clients 104 is a general-purpose computational device, for example, a personal computer, a laptop, a palmtop, a personal digital. assistant (PDA), a mobile cellular device, and the like. Further, each of workgroup clients 104 runs a workgroup client software application. The workgroup client software application accesses workgroup server 102 to retrieve the one or more workgroup objects.

In various embodiments of the present invention, workgroup system 100 may be implemented in any of a variety of architectures, including, a 2-tier architecture (client-server architecture), a 3-tier architecture, an N-tier architecture, a peer-to-peer architecture, a tightly-coupled architecture, a service-oriented architecture, a mobile-code-based architecture, and a replicated-repository-based architecture. Those skilled in the art will recognize that the present invention, as will be described below with reference to the 2-tier (client-server) architecture, can be implemented in any of the variety of architectures mentioned above.

Figure 2:
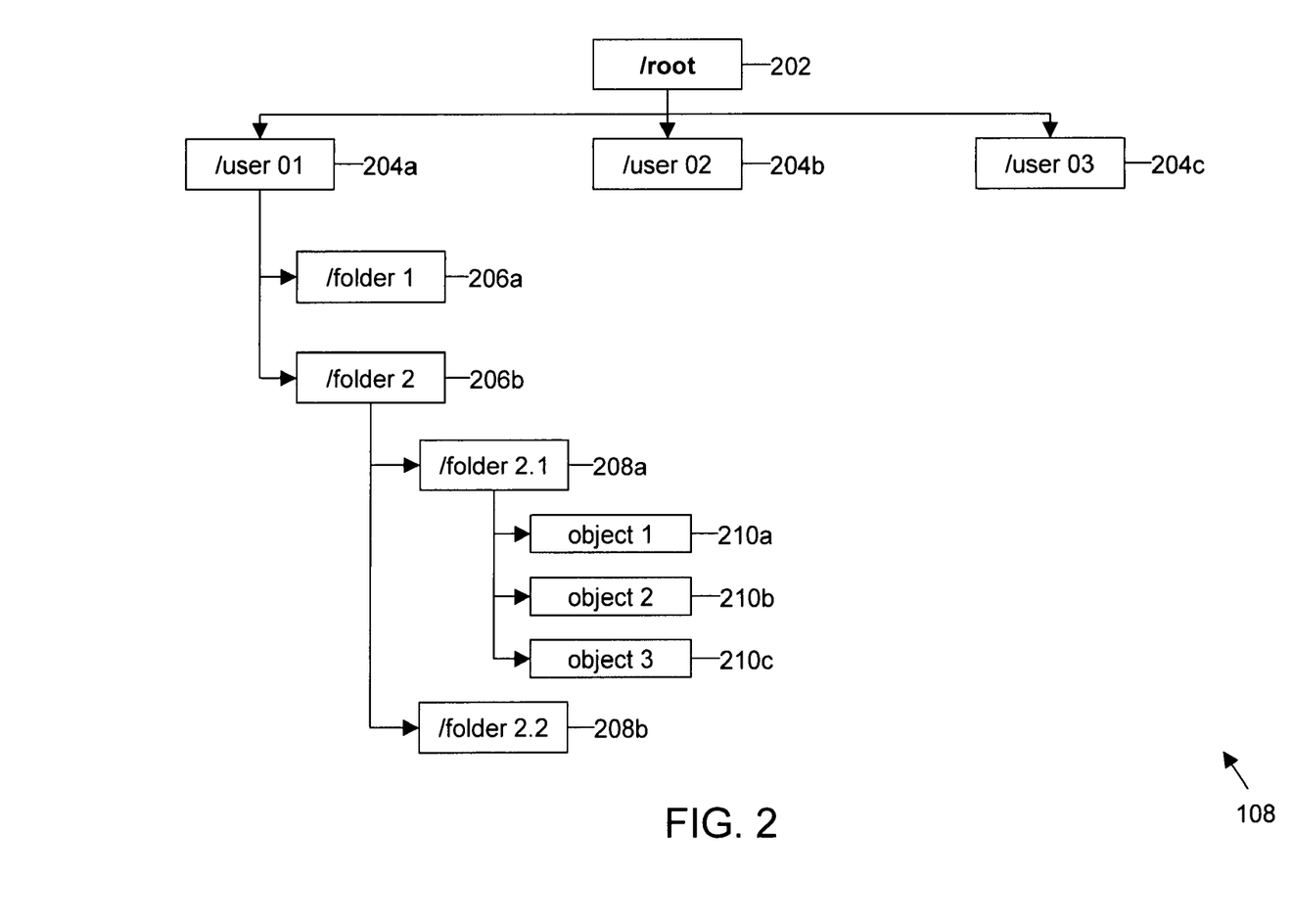
FIG. 2 is a block diagram illustrating a hierarchy of folders in a data store, in accordance with an embodiment of the present invention.

FIG. 2 is a block diagram illustrating a hierarchy of folders in data store 108, in accordance with an embodiment of the present invention. Data store 108 includes a 'root' folder 202. Root folder 202 includes a plurality of user-account folders such as a 'user 01' folder 204a, a 'user 02' folder 204b, and a 'user 03' folder 204c. Each user-account folder includes one or more folders; the one or more folders may similarly include one or more sub-folders and so forth. For example, 'folder 2' 206b includes subfolders 'folder 2.1' 208a and 'folder 2.2' 208b. Each of the one or more folders and the one or more sub-folders may include one or more workgroup objects. For example, 'folder 2.1' 208a includes an 'object 1' 210a, an 'object 2' 210b, and an 'object 3' 210c, hereinafter referred to as workgroup objects 210. Each of the one or more workgroup objects may be defined as an entity representing one of an e-mail message, an individual calendar, a group calendar, a shared file, a shared folder, a user-scheduled task, an address book, an electronic form, and the like.

The workgroup client software application in workgroup client 104 displays a list of workgroup objects 210 included in an active folder. For example, when 'folder 2.1' 208a is active in a client user-interface provided by the workgroup client software application, a list of workgroup objects 210 is displayed. The workgroup client software application presents an abbreviated display of each object to display the list. As described herein, a property of workgroup object 210 used for abbreviated display of workgroup object 210 for displaying the contents of a folder is referred to as an abbreviated display property of workgroup object 210. The workgroup client software application further provides a full display of object 210 after receiving a request for full display.

Figure 3:
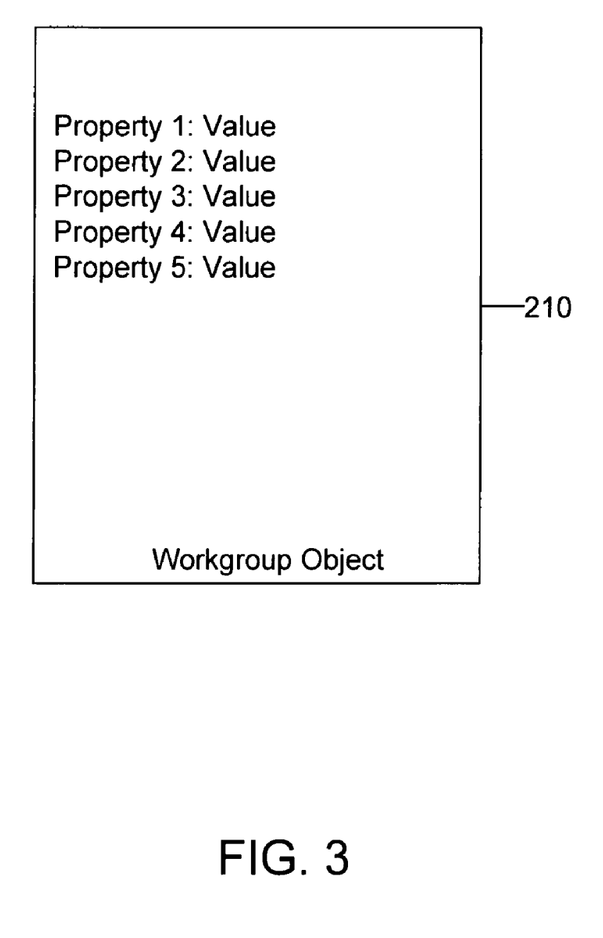
FIG. 3 is a block diagram illustrating a workgroup object, in accordance with an embodiment of the present invention.

FIG. 3 is a block diagram illustrating workgroup object 210, in accordance with an embodiment of the present invention. Workgroup object 210 includes a set of properties, each property having an associated value. For example, as shown in FIG. 3 workgroup object 210 includes 'property 1', 'property 2', and so forth. The property may be a simple data type, a complex data type, a binary file, and an embedded workgroup object.

Simple data types include Boolean, date, integer, strings, and so forth. Complex data types include, but not limited to, multi-value lists of simple data type, data in binary format, and a table. The table includes a set of rows each containing one or more properties.

For example, an e-mail message includes a plurality of header fields and a body. The header fields may include one or more of a 'From' field, a 'Sender' field, a 'Reply-To' field, a 'To' field, a 'CC' field, a 'BCC' field, a 'Message-Id' field, an 'In-Reply-To' field, a 'References' field, a 'Subject' field, a 'Comments' field, a 'Keywords' field, an 'Optional' field, and the like. The e-mail message may also include one or more attachments. In addition, the e-mail may include one or more embedded e-mail messages. Each of the header fields, body, and the one or more attachments constitutes a property for an e-mail message. Likewise, other workgroup objects representing one of an individual calendar, a group calendar, a shared file, a shared folder, a user-scheduled task, an addressbook, an electronic form, and the like, include one or more properties.

Figure 4:
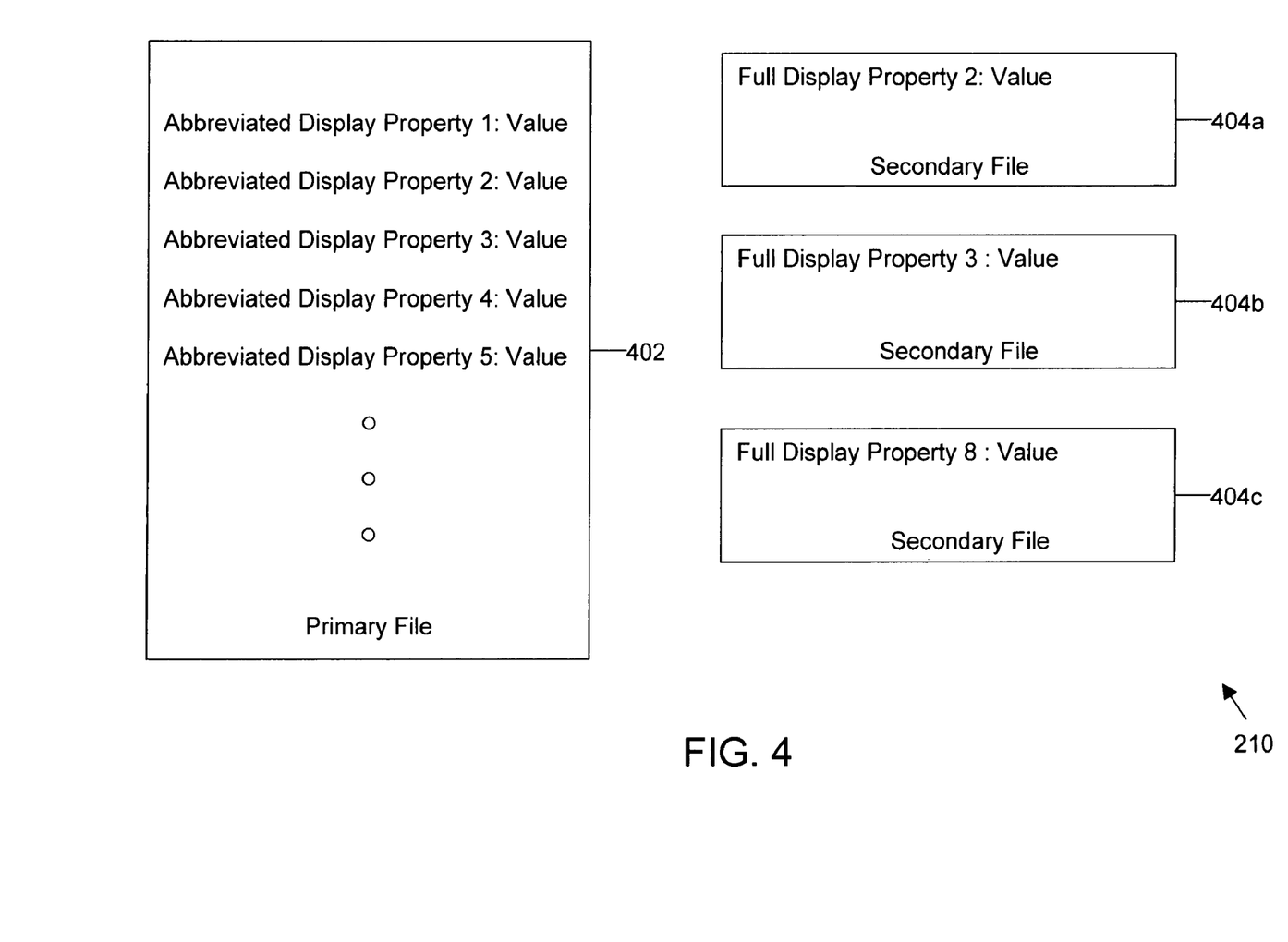
FIG. 4 is a block diagram illustrating a file structure for storing the workgroup object, in accordance with an embodiment of the present invention.

FIG. 4 is a block diagram illustrating a file structure for workgroup object 210, in accordance with an embodiment of the present invention. Workgroup object 210 includes a primary file 402 and one or more secondary files 404a, 404b, and 404c, hereinafter referred to as secondary files 404. Primary file 402 includes one or more identifiers, each of the one or more identifiers uniquely identifying secondary file 404.

In an embodiment of the present invention, a property of the workgroup object 210 is classified as at least one of a first set of properties and a second set of properties. The classification is based on at least one of the size of the property and the nature of the property. The nature of the property, as referred to herein, signifies the need of the property for an abbreviated display of workgroup object 210 in a list display of the contents of the active folder in a client interface. In case, a property is included in the first set of properties and the second set of properties, the value of the property is truncated based on a predefined truncation algorithm to generate a corresponding truncated value. The property containing the corresponding truncated value (hereinafter referred to as a truncated property) is included in the first set of properties and the property containing a complete value of the property (hereinafter referred to as a complete property) is included in the second set of properties. As used herein, the properties included in the first set of properties are also referred to as abbreviated display properties. Similarly, the properties included in the second set of properties are also referred to as full display properties.

In an embodiment of the present invention, primary file 402 includes such properties that may be required for an abbreviated display of workgroup object 210 (hereinafter referred to as abbreviated display properties) in the client user-interface to display a list of workgroup objects 210 in an active folder, such as 'folder 2.1', (explained in conjunction with FIG. 2) on workgroup client 104. In an embodiment of the present invention, the abbreviated display properties are stored in logically sequential memory blocks on a storage device to ensure retrieval in a single disk access.

In an embodiment of the present invention, if the size of an abbreviated display property exceeds a predefined threshold, the abbreviated display property is suitably truncated to generate a corresponding truncated property. The corresponding truncated property is included in primary file 402. The corresponding complete property is included in one of secondary files 404. In an embodiment of the present invention, the truncated property includes an identifier for secondary file 404 storing the complete property.

In an embodiment of the present invention, each of the properties included in the second set of properties (hereinafter referred to as full display properties) is stored individually in one of secondary files 404.

In an embodiment of the present invention, the information related to the total size of the abbreviated display properties is encoded in one of the file-properties of primary file 402, the file-properties of primary file 402 being maintained by the file-system. The file-system maintains one or more properties for each of the files stored in the file system. Examples of file-properties of the files include file-name, file-size, file-type, date-modified, extended properties of a file and so forth. In an embodiment of the present invention, the information is encoded in one of the extended properties of primary file 402. In another embodiment of the present invention, the information related to the total size of the abbreviated display properties is encoded in primary file 402 through altering the size of primary file 402 such that the size of primary file 402 deviates from an integral number of memory blocks. For example, assuming that the size of a memory page is 256 bytes and four memory pages constitutes one memory block. In this example, if primary file 402 requires 2048 bytes of memory, primary file 402 will require two memory blocks. Further, assuming that the abbreviated display properties require one memory block, primary file 402 is allocated a total of 2049 bytes, such that the additional memory block indicates that the abbreviated display properties are stored in one memory block in the beginning of primary file 402.

In an embodiment of the present invention, workgroup client software application may be required to display a summary of status of workgroup objects 210 stored in 'folder 2.1'. For example, in case of e-mail messages, workgroup client software application may display a summary of one of the total number of e-mail messages, the total number of read e-mail messages, and the total number of unread e-mail messages. In an embodiment of the present invention, information related to the status of workgroup object 210 is encoded in primary file 402. For example, in case of workgroup object 210 representing an e-mail message the information related to the read/unread status of the e-mail message is encoded in one of the file-name, the file-size, and any such property maintained by the file-system.

In an embodiment of the present invention, if there is one full display property in addition to the abbreviated display properties of workgroup object 210, the full display property is included in primary file 402 in order to optimize memory management. Therefore, in this embodiment, workgroup object 210 is stored in primary file 402 and there are no secondary files 404 associated with workgroup object 210.

Figure 5:
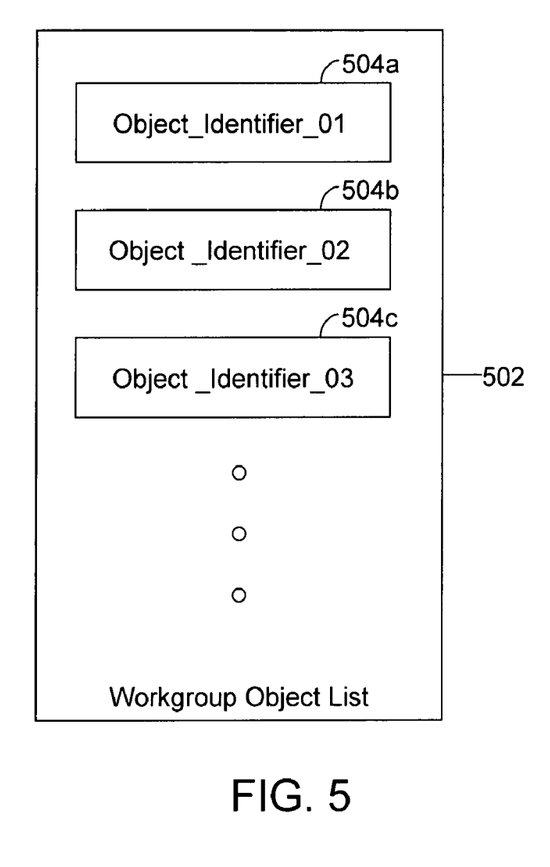
FIG. 5 is a block diagram illustrating a structure of a workgroup object list, in accordance with an embodiment of the present invention.

In an embodiment of the present invention, workgroup system 100 manages workgroup objects 210 through a workgroup object list 502, as described in detail in conjunction with FIG. 5.

FIG. 5 is a block diagram illustrating a structure of a workgroup object list 502, in accordance with an embodiment of the present invention. Workgroup object list 502 includes a plurality of object identifiers, such as an object_identifier_01 504a, an object_identifier_02 504b, and an object_identifier_03 504c, hereinafter referred to as object identifiers 504. Workgroup object list 502 maintains object identifiers 504 in a sorted order based on information included in object identifiers 504. Each object identifier uniquely identifies a corresponding workgroup object stored on workgroup server 102. For example, object_identifier_01 504a may uniquely identify 'object-1' 210a.

In an embodiment of the present invention, when workgroup object 210 is stored on workgroup server 102, object identifier 504 is generated and inserted in workgroup object list 502 at an appropriate location based on a binary search to maintain the sort order of workgroup object list 502. Similarly, when workgroup object 210 is deleted from workgroup server 102, object identifier 504 is located in workgroup object list 502 and removed.

Figure 6:
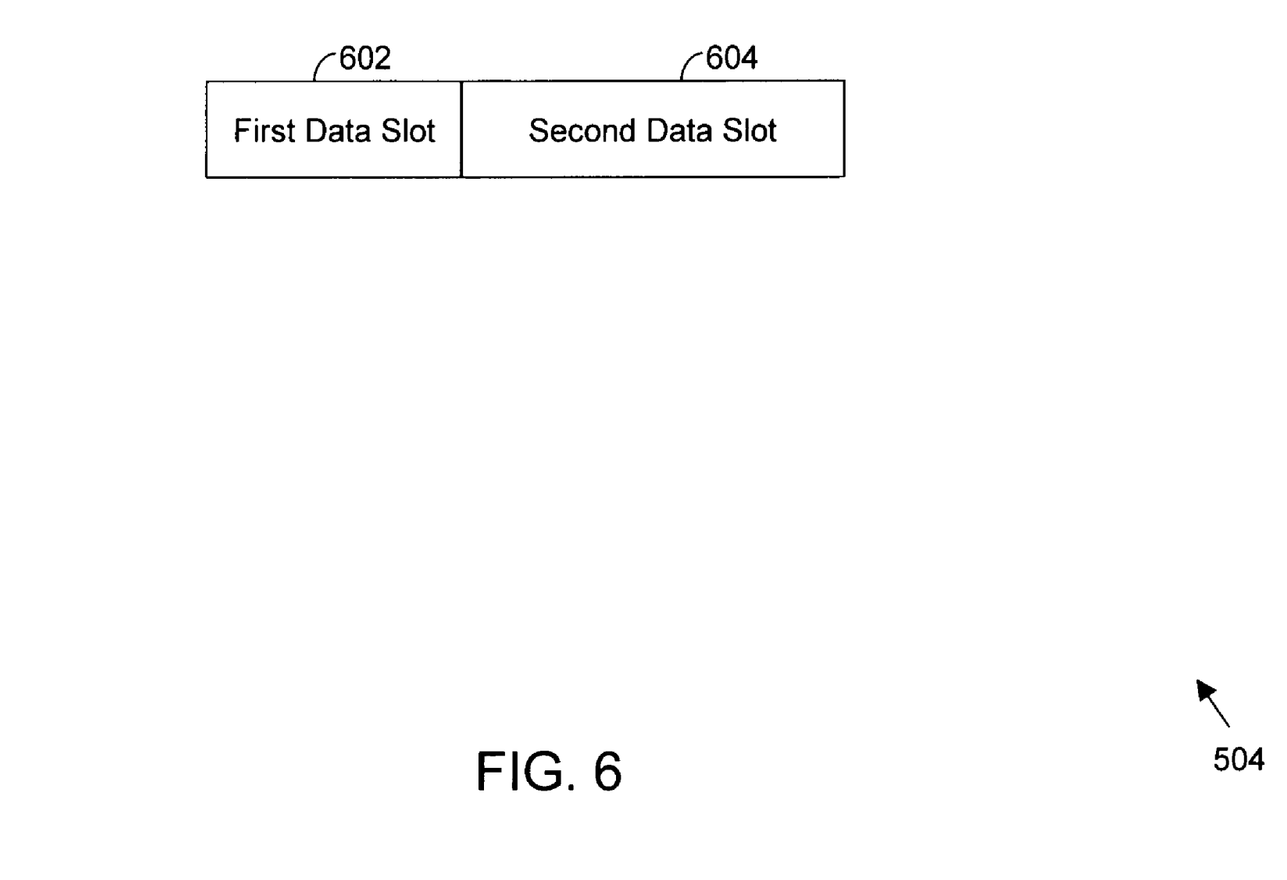
FIG. 6 is a block diagram illustrating a structure of an object identifier, in accordance with an embodiment of the present invention.

FIG. 6 is a block diagram illustrating a structure of object identifier 504, in accordance with an embodiment of the present invention. In an embodiment of the present invention, object identifier 504 is a data structure including a first data slot 602 and a second data slot 604. First data slot 602 includes an identity of workgroup object 210 and second data slot 604 includes a property of workgroup object 210. In an embodiment of the present invention, workgroup object list 502 is sorted based on the property stored in second data slot 604.

In an embodiment of the present invention, if the size of the property exceeds a predefined threshold, the property is suitably truncated to generate a truncated property. Thereafter, the truncated property is stored in second data slot 604.

Figure 7:
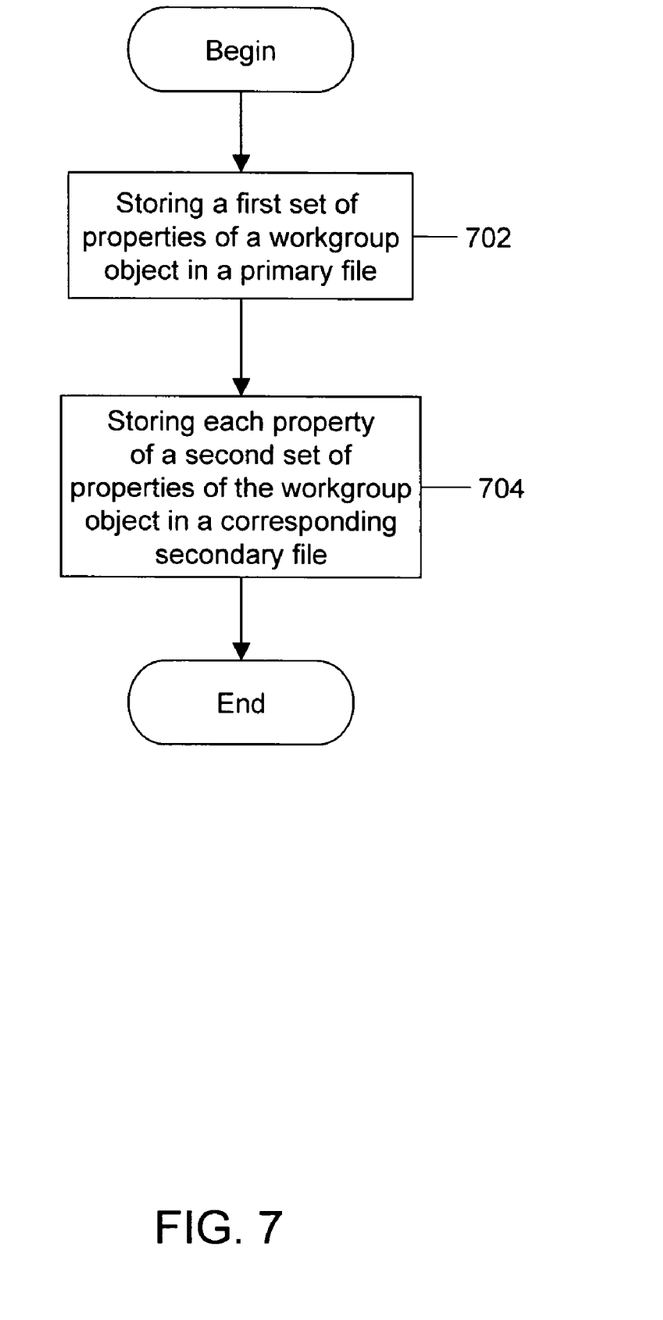
FIG. 7 is a flowchart illustrating a method for storing the workgroup object on the workgroup server, in accordance with an embodiment of the present invention.

FIG. 7 is a flowchart illustrating a method for storing workgroup object 210 on workgroup server 102, in accordance with an embodiment of the present invention.

At 702, a first set of properties of workgroup object 210 is stored in a primary file such as primary file 402. At 704, each property in a second set of properties of workgroup object 210 is stored in a secondary file, such as secondary file 404. For example, as depicted in FIG. 4, secondary file 404a stores 'full display property 2'. (The first set of properties and the second set of properties have been explained in conjunction with FIG. 4)

Figure 8A:
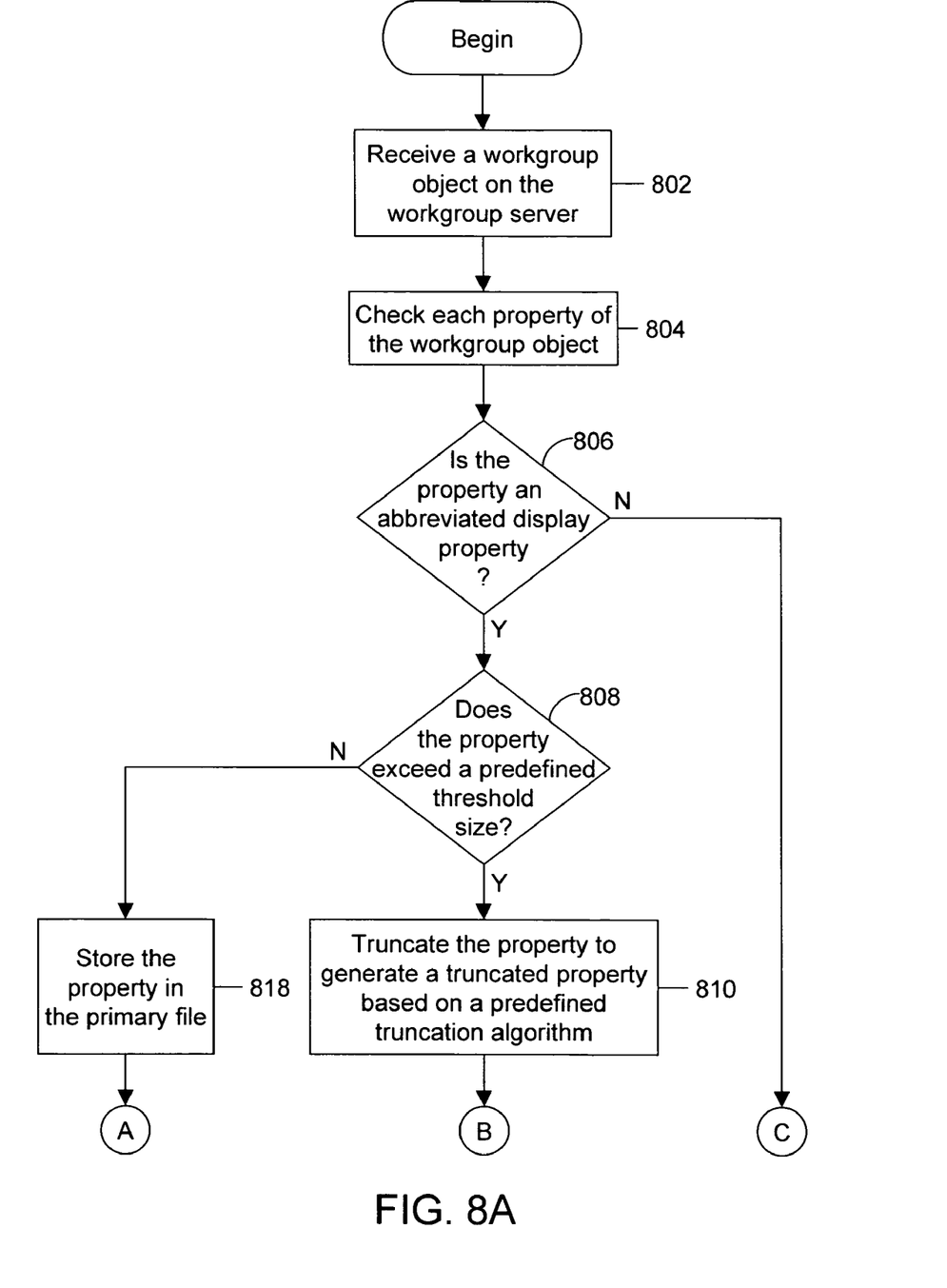
FIGS. 8A and 8B depict a flowchart illustrating a method for storing the workgroup object on the workgroup server, in accordance with an embodiment of the present invention.
Figure 8B:
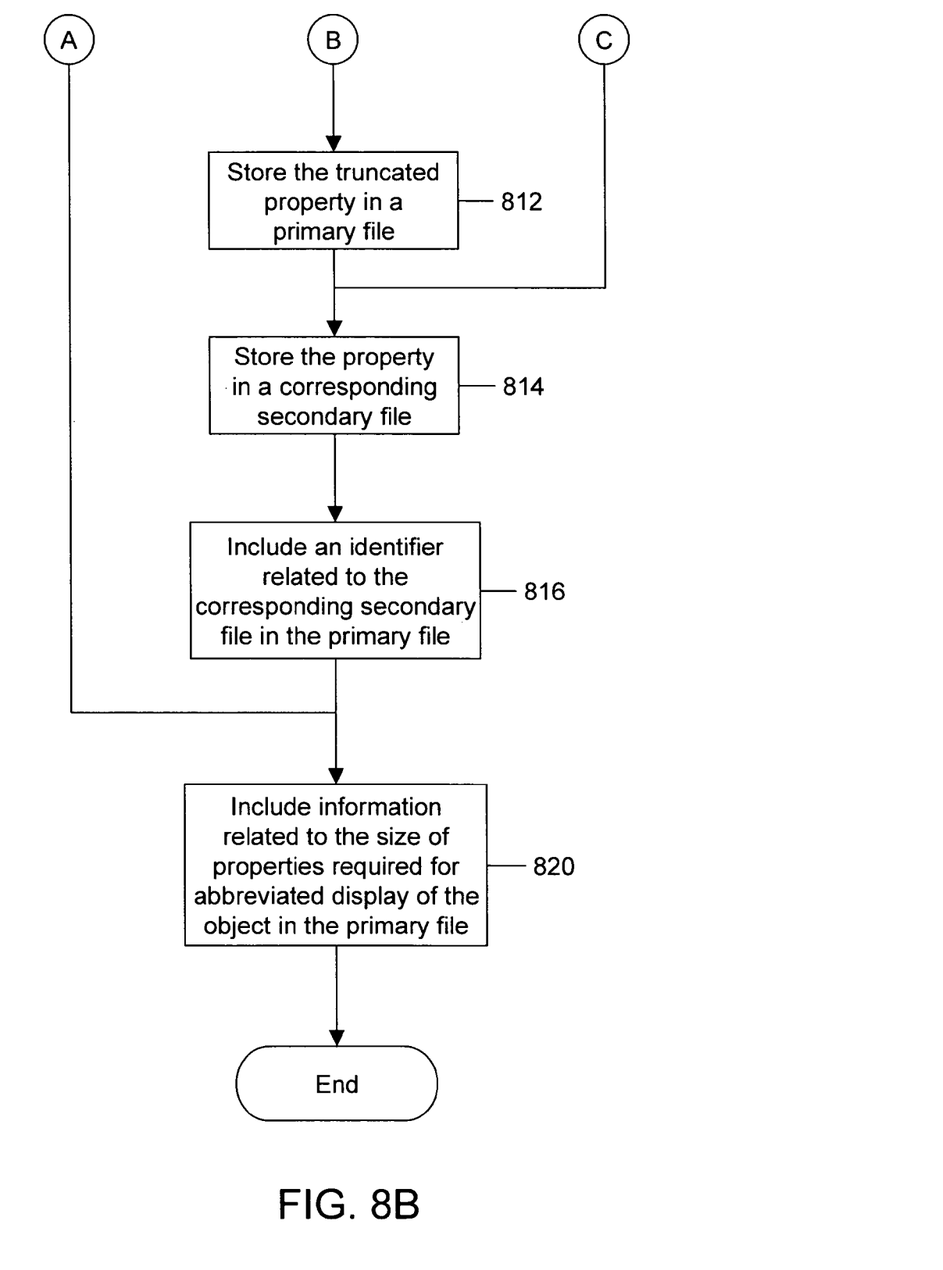

FIGS. 8A and 8B depict a flowchart illustrating a method for storing workgroup object 210 on workgroup server 102, in accordance with an embodiment of the present invention.

At 802, a workgroup object, such as workgroup object 210, is received on the workgroup server 102. At 804, each property of the workgroup object is examined. The subsequent steps are performed for each property. At 806, the property is identified as one of the abbreviated display properties and the full display properties (the abbreviated display properties and the full display properties have been explained in conjunction with FIG. 4). At 806, if the property is one of the abbreviated display properties, the size of the property is checked at 808. At 808, if the size of the property exceeds a predefined threshold value then at 810, the property is truncated to generate a truncated property based on a predefined truncation algorithm. At 812, the truncated property is stored in a primary file, such as primary file 402. At 814, the complete property is stored in a corresponding secondary file, such as secondary file 404. At 816, an identifier for the secondary file is included in the truncated property of the workgroup object stored in the primary file.

At 806 if the property is a full display property, then at 814, the property is stored in a corresponding secondary file. At 816, the information related to the secondary files is included in the primary file. At 808, if the abbreviated display property does not exceed the predefined threshold value, then at 818, the property is stored in the primary file.

Therefore, each property is scrutinized and saved in one of the primary file and the secondary files. Finally, at 820, the information related to the total size of the abbreviated display properties, required for the display of list of workgroup objects in the client user-interface at a workgroup client, such as workgroup client 104a, is encoded in the primary file (described in detail in conjunction with FIG. 4).

In an embodiment of the present invention, primary file 402 is first stored in a temporary memory. Secondary files 404 are directly stored in a permanent memory. Primary file 402 is moved from the temporary memory to the permanent memory when secondary files 404 have been successfully stored in the permanent memory and corresponding references have been included in primary file 402. It will be appreciated that storing primary file 402 first in the temporary memory and then moving primary file 402 to the permanent memory, when secondary files 404 have been successfully stored in the permanent memory and the corresponding references have been included in primary file 402, helps in avoiding any bad references in primary file 402 in case of a system error while storing workgroup object 210. Therefore, storing a file as described herein includes storing the file in one of the temporary memory and the permanent memory.

Figure 9:
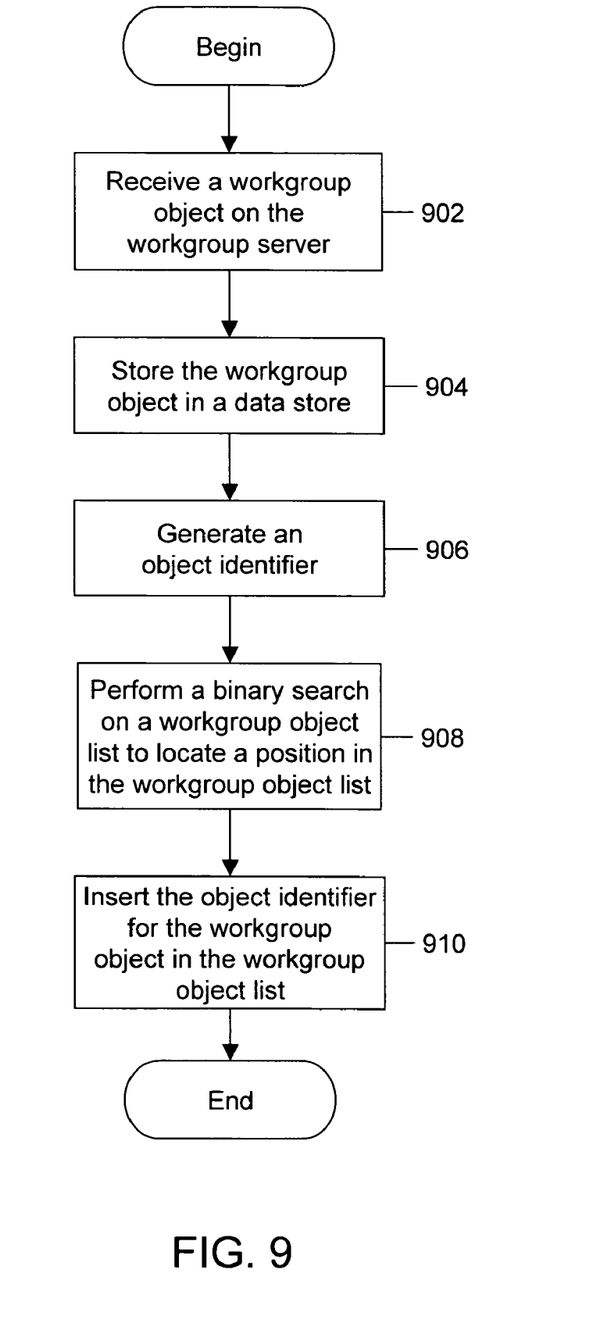
FIG. 9 is a flowchart illustrating a method for inserting the object identifier in the workgroup object list, in accordance with an embodiment of the present invention.

FIG. 9 is a flowchart illustrating a method for inserting object identifier 504 in workgroup object list 502, in accordance with an embodiment of the present invention.

At 902, a workgroup object, such as workgroup object 210, is received on a workgroup server, such as workgroup server 102. At 904, the workgroup object is stored in a data store, such as data store 108, in accordance with the method described in conjunction with FIG. 7 and FIG. 8. At 906, an object identifier, such as object identifier 504, is generated (the object identifier has been explained in detail in conjunction with FIG. 6). At 908, a binary search is performed on the workgroup object list to locate a position to insert the object identifier for the workgroup object. At 910, the object identifier is inserted at the position located at 908.

Figure 10:
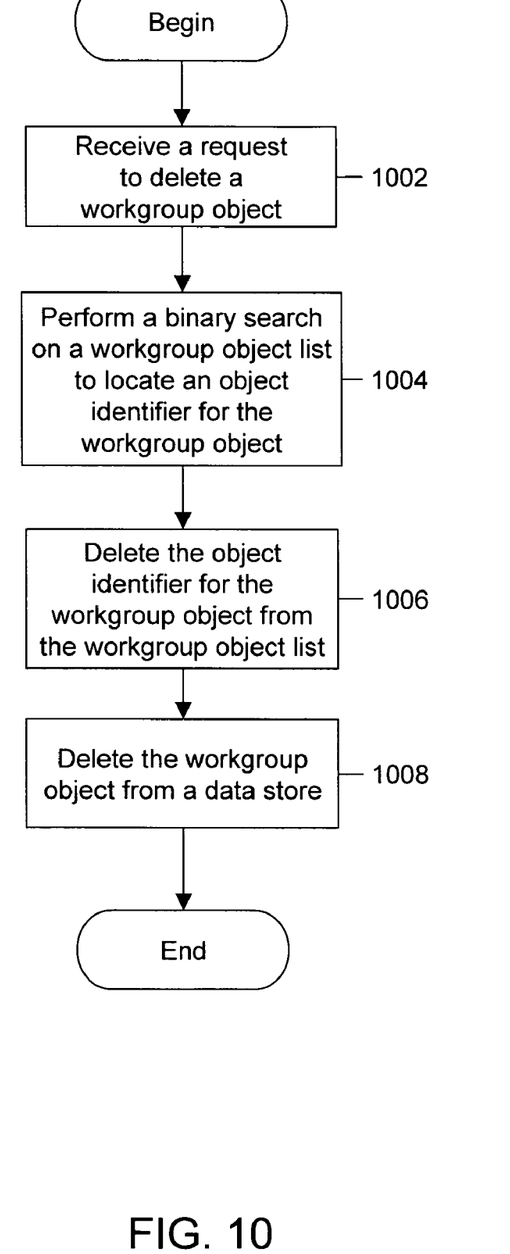
FIG. 10 is a flowchart illustrating a method for deleting the object identifier from the workgroup object list, in accordance with an embodiment of the present invention.

FIG. 10 is a flowchart illustrating a method for deleting object identifier 504 from workgroup object list 502, in accordance with an embodiment of the present invention.

At 1002, a request to delete a workgroup object, such as workgroup object 210, is received on a workgroup server, such as workgroup server 102. At 1004, a binary search is performed to locate the object identifier for the workgroup object. At 1006, the object identifier for the workgroup object is deleted. At 1008, the workgroup object is deleted.

The file-system based storage on a workgroup server, as described herein, thus offers several advantages. The present invention helps in reducing the disk-access activities for various operations associated with the workgroup server, for example, listing of folders, listing of contents of a folder, displaying an object, and so forth. The present invention provides the facility to optimize the disk-access activities and thereby to improve the performance based on the information of the specific details of the problem domain and common usage patterns.

Further, the present invention provides the end-users the facility to exploit a variety of tools and utilities for performing various activities associated with the workgroup server. This is possible due to the implementation of a file-system based data store in place of a proprietary data store. Therefore, the end-users have the option of choosing from a variety of tools available from the third-party vendors.

Moreover, the present invention reduces memory required to store workgroup object lists in active memory. The workgroup object lists include simple data structures which are sorted based on data stored in the data structure. The binary search used to locate a position in the list helps to reduce the system overheads and thereby improves the efficiency. Further, the present invention facilitates the administration of the workgroup server by providing such features as live back-up of data, clustering, journaling, caching, and so forth.

The present invention, thus offers a simpler, more efficient, and more flexible workgroup system that is easier to implement and maintain.

The workgroup server, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device, which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. A workgroup server, the workgroup server managing one or more workgroup objects, the workgroup server comprising:
   a.) one or more primary files, each of the one or more primary files having a one-to-one mapping with one of the one or more workgroup objects, each workgroup object representing an entity created by a business software application, and having a plurality of properties associated with the entity that the workgroup object represents; and
   b.) one or more secondary files, each of the one or more secondary files corresponding to one of the one or more workgroup objects, and being associated with one of the one or more primary files,
   wherein the one or more secondary files are stored separately from the one or more primary files, and each one of the one or more primary files includes a reference to a corresponding one of the one or more secondary files,
   wherein
      each of the one or more primary files comprises a first set of properties of the corresponding workgroup object to which the respective primary file is mapped,
      the first set of properties of each primary file are truncated versions of the respective properties of the mapped workgroup object required for an abbreviated display of the mapped workgroup object at a workgroup client connected to the workgroup server,
      each of the one or more secondary files comprises a second set of properties of the corresponding workgroup object to which the respective secondary file is mapped, and
      the second set of properties of each secondary file are full versions of the respective properties of the mapped workgroup object required for a full display of the mapped workgroup object at the workgroup client.

2. The workgroup server according to claim 1, wherein the one or more properties of the mapped workgroup object are stored in a minimum number of memory blocks on a storage device.

3. The workgroup server according to claim 1, wherein the one or more properties of the mapped workgroup object are stored sequentially on a storage device.

4. The workgroup server according to claim 1, wherein the first set of properties of the mapped workgroup object are truncated based on at least one of a size of the at least one of the one or more properties and a nature of the at least one of the one or more properties.

5. The workgroup server according to claim 4, wherein the truncated property further comprises information related to a secondary file storing a complete value of the property.

6. The workgroup server according to claim 1, wherein each of the one or more primary files comprises information related to the size of the one or more properties required for the abbreviated display of the mapped workgroup object.

7. The workgroup server according to claim 6, wherein the information related to the size of the one or more properties required for the abbreviated display of the mapped workgroup object is encoded in a file property of the one or more primary files, the file property being managed by a file-system.

8. The workgroup server according to claim 6, wherein the information related to the size of the one or more properties required for the abbreviated display of the mapped workgroup object is encoded in the one or more primary files, the encoding being performed through altering size of the one or more primary files.

9. The workgroup server according to claim 1, wherein the first set of properties further comprises one or more properties of the mapped workgroup object required for a full display of the mapped workgroup object.

10. The workgroup server according to claim 1, wherein the one or more primary files further comprise information related to the status of the one or more workgroup objects, the information being encoded in a file property of the one or more primary files, the file property being managed by a file-system.

11. The workgroup server according to claim 1 further including one or more workgroup object lists, each of the one or more workgroup object lists comprising information related to the one or more workgroup objects stored on the workgroup server.

12. The workgroup server according to claim 11, wherein each of the one or more workgroup object lists comprises one or more data structures corresponding to the one or more workgroup objects stored on the workgroup server, the one or more data structures having a one-to-one mapping with the one or more workgroup objects.

13. The workgroup server according to claim 12, wherein each of the one or more data structures comprises a first data slot to store an identity of a mapped workgroup object.

14. The workgroup server according to claim 12, wherein each of the one or more data structures comprises a second data slot to store a property of the mapped workgroup object.

15. The workgroup server according to claim 14, wherein the property is truncated based on a truncation algorithm.

16. The workgroup server according to claim 14, wherein the property is used to sort a list.

17. The workgroup server according to claim 1, wherein the workgroup server is configured to store the one or more primary files in temporary memory, store the one or more secondary files in permanent memory and subsequently move the one or more primary files to permanent memory when the one or more secondary files have been successfully stored in the permanent memory and corresponding references to the one or more secondary files have been included in the one or more primary files.

18. A method for managing one or more workgroup objects on a workgroup server, the method comprising the steps of:

storing a first set of properties of the one or more workgroup objects in one or more primary files on the workgroup server, each of the one or more primary files having a one-to-one mapping with one of the one or more workgroup objects, each workgroup object representing an entity created by a business software application, and having a plurality of properties associated with the entity that the workgroup object represents;

storing a second set of properties of each of the one or more workgroup objects in one or more secondary files, the one or more secondary files being associated with the one or more primary files wherein the one or more secondary files being are stored separately from the one or more primary files, and each one of the one or more primary files includes a reference to a corresponding one of the one or more secondary files; and encoding information related to a size of one or more properties of a mapped workgroup object required for an abbreviated display of the mapped workgroup object, the information being encoded in a property of the one or more primary files, wherein the first set of properties of each primary file are truncated versions of the respective properties of the mapped workgroup object required for the abbreviated display of the mapped workgroup object at a workgroup client connected to the workgroup server, and the second set of properties of the one or more secondary files are full versions of the respective properties of the mapped workgroup object required for a full display of the mapped workgroup object at the workgroup client.

19. The method according to claim 18, wherein the step of storing the first set of properties comprises identifying one or more properties of a workgroup object to be included in the first set of properties of the workgroup object.

20. The method according to claim 19, wherein the first set of properties are truncated based on at least one of a size of the at least one of the one or more properties and a nature of the at least one of the one or more properties, to generate the truncated property, the truncated property comprising a truncated value of a property.

21. The method according to claim 20, wherein the step of truncating at least one of the one or more properties of the workgroup object comprises the step of including information related to a secondary file, the secondary file storing a complete value of the at least one of the one or more properties.

22. The method according to claim 18 wherein the information related to the size of one or more properties of a mapped workgroup object required for an abbreviated display of the mapped workgroup object is encoded in the one or more primary files, the encoding being performed by the step of altering the size of the one or more primary files.

23. The method according to claim 18 further comprising the step of encoding information related to the status of the one or more workgroup objects in the one or more primary files, the information being encoded in a file property of the one or more primary files, the file property being managed by a file-system.

24. The method according to claim 18 further comprising the step of identifying one or more properties of a workgroup object to be included in the second set of properties of the workgroup object.

25. The method according to claim 18 further comprising maintaining one or more workgroup object lists, the one or more workgroup object lists comprising information related to the one or more workgroup objects stored on the workgroup server.

26. The method according to claim 25, wherein each of the one or more workgroup object lists comprises one or more data structures corresponding to the one or more workgroup objects, the one or more data structures having a one-to-one mapping with the one or more workgroup objects.

27. The method according to claim 26, wherein each of the one or more data structures comprises one or more data slots to store at least one of an identity and a property of a mapped workgroup object stored on the workgroup server.

28. The method according to claim 27, wherein the property of the workgroup object is truncated based on a truncation algorithm.

29. The method according to claim 25, wherein the step of maintaining the one or more workgroup object lists comprises the step of sorting the one or more workgroup object lists based on a property of the one or more workgroup objects.

30. The method according to claim 25, wherein the step of maintaining the one or more workgroup object lists comprises at least one of the steps of adding an object identifier to at least one of the one or more workgroup object list and deleting an object identifier from at least one of the one or more workgroup object lists.

31. The method according to claim 18, further comprising storing the one or more primary files in temporary memory, storing the one or more secondary files in permanent memory and subsequently moving the one or more primary files to permanent memory when the one or more secondary files have been successfully stored in the permanent memory and corresponding references to the one or more secondary files have been included in the one or more primary files.

32. A computer program product for use with a computer for managing one or more workgroup objects on a workgroup server, the computer program product comprising a computer readable medium comprising:

program instruction means for storing a first set of properties of the one or more workgroup objects in one or more primary files on the workgroup server, the one or more primary files having a one-to-one mapping with the one or more workgroup objects, each workgroup object representing an entity created by a business software application, and having a plurality of properties associated with the entity that the workgroup object represents; and program instruction means for storing a second set of properties of the one or more workgroup objects in one or more secondary files, the one or more secondary files being associated with the one or more primary files, wherein the one or more secondary files are stored separately from the one or more primary files, and each one of the one or more primary files includes a reference to a corresponding one of the one or more secondary files, wherein the first set of properties of each primary file are truncated versions of the respective properties of the one or more workgroup objects being required for an abbreviated display of the one or more workgroup objects at a workgroup client connected to the workgroup server, and the second set of properties of the one or more secondary files are full versions of the respective properties of the mapped workgroup object required for a full display of the mapped workgroup object at the workgroup client.

33. The computer program product according to claim 32 further comprising program instruction means for truncating the one or more properties of the one or more workgroup objects based on a truncation algorithm.

34. The computer program product according to claim 32 further comprising program instruction means for encoding information of one or more properties of the one or more workgroup objects in data available through a file-system directory scan.

35. The computer program product according to claim 32 further comprising program instruction means for storing the one or more secondary files in permanent memory and subsequently moving the one or more primary files to permanent memory when the one or more secondary files have been successfully stored in the permanent memory and corresponding references to the one or more secondary files have been included in the one or more primary files.

* * * * *